United States Patent [19]

Eckert

[11] Patent Number: 4,951,631
[45] Date of Patent: Aug. 28, 1990

[54] FUEL INJECTION DEVICE, IN PARTICULAR, A UNIT FUEL INJECTOR, FOR INTERNAL COMBUSTION ENGINES

[75] Inventor: Konrad Eckert, Stuttgart, Fed. Rep. of Germany

[73] Assignee: Robert Bosch GmbH, Stuttgart, Fed. Rep. of Germany

[21] Appl. No.: 340,210

[22] Filed: Apr. 19, 1989

[30] Foreign Application Priority Data

Jul. 14, 1988 [DE] Fed. Rep. of Germany ....... 3823827

[51] Int. Cl.$^5$ .................................................. F02M 57/02
[52] U.S. Cl. ....................................... 123/446; 123/501; 239/88; 239/95
[58] Field of Search ............... 123/446, 447, 500, 501, 123/502, 506; 239/88–96, 533.1–533.12

[56] References Cited

U.S. PATENT DOCUMENTS

| | | | |
|---|---|---|---|
| 3,802,626 | 4/1974 | Regineault | 239/533.5 |
| 4,092,964 | 6/1978 | Höfer et al. | 123/139 |
| 4,129,253 | 12/1978 | Bader | 239/88 |
| 4,129,254 | 12/1978 | Bader | 239/96 |
| 4,134,549 | 1/1979 | Perr | 239/92 |
| 4,235,374 | 11/1980 | Walter et al. | 239/90 |
| 4,250,857 | 2/1981 | Taplin | 123/448 |
| 4,279,385 | 7/1981 | Straubel | 239/88 |
| 4,281,792 | 8/1981 | Sisson et al. | 239/5 |
| 4,378,774 | 4/1983 | Kato | 123/446 |
| 4,399,793 | 8/1983 | Poore | 239/95 |
| 4,402,456 | 9/1983 | Schneider | 123/446 |
| 4,463,725 | 8/1984 | Laufer et al. | 123/446 |
| 4,471,740 | 9/1984 | Jourde | 123/446 |
| 4,485,787 | 12/1984 | Kato | 123/446 |
| 4,489,886 | 12/1984 | Kato | 239/88 |
| 4,503,825 | 3/1985 | Schneider | 123/446 |
| 4,653,448 | 3/1987 | Ohmori | 123/446 |
| 4,759,330 | 7/1988 | Kato | 123/446 |

FOREIGN PATENT DOCUMENTS 0217759 12/1983 Japan .................................... 123/446

*Primary Examiner*—Carl Stuart Miller
*Attorney, Agent, or Firm*—Edwin E. Greigg

[57] ABSTRACT

In a fuel injection device for internal combustion engines, having a pump plunger driven via a drive cam and a pressure chamber disconnected from a pump chamber by an intermediate plunger that upon its working stroke always assumes the end positions, a pressure line that leads from the pressure chamber to an injection nozzle. A control valve in a supply line for low-pressure fuel metering, the supply line is connected, under the control of the pump plunger with the pressure chamber via a filling line during a first intake stroke segment, for an injection quantity metering that is also angle controlled, and toward the end of the intake stroke of the pump plunger, the supply line is connected to the pump chamber for a time-controlled metering that determines the injection onset.

22 Claims, 3 Drawing Sheets

FUEL INJECTION DEVICE, IN PARTICULAR, A UNIT FUEL INJECTOR, FOR INTERNAL COMBUSTION ENGINES

BACKGROUND OF THE INVENTION

The invention is based on a fuel injection device for internal combustion engines, such as a fuel injector defined hereinafter.

With such generic fuel injection devices and in particular unit fuel injectors, a greater degree of freedom is attained, in terms of intervening to govern and control the entire course of events involved in injection, than is possible with conventional injection devices using a distributor or in-line type of injection pump. This greater freedom is partly due to operating at a higher injection pressure, which some high-speed direct-injection engines require. Moreover, the engine camshaft is typically used to drive the pump plunger, so that existing drive mechanisms are put to additional use, which reduces both expenses and power losses.

In the unit fuel injectors of this generic type, as well as in unit fuel injectors not having an earlier priority, a great number of variants using a suitable intermediate or secondary plunger are known. In these pumps, the supply onset, which determines the injection onset, and the supply quantity intended for injection are defined via the control of the fuel quantities in the pump chamber and in the pressure chamber. The cam used to drive the unit fuel injector is usually available on the engine camshaft. The fuel quantities are controlled as a function of angle and time; angle control refers to control of the plunger stroke by the drive cam, while timing control refers to the opening of a fuel line by the control valve. The cam drive path can be divided into three segments: a slowly dropping intake stroke segment (run-off edge), a repose segment (cam base circle) and an ensuing steep compression stroke segment (compression stroke edge) that changes into the intake stroke segment. This compression stroke segment of the cam path is relatively short and steep, to attain the desired injection effect, which requires fast pump plunger motion. The intake stroke segment, contrarily, is relatively flat to enable the suction effect at the required control times, and in combination with the repose segment is also relatively long, to make as much control time available as possible, since in this plunger operating position, usually only pure timing control is available, via the control valve.

With these generic injection devices, the control of the supply quantity and adjustment of the supply onset also takes place without a governor rod or centrifugal adjuster of the kind typical for in-line pumps, but instead with the aid of the control valve, which at the correct time meters a suitable quantity of fuel into one of the chambers, jointly with the action of the control edges of the pump plunger or intermediate piston and with check valves. As used here, the term check valves includes valves of any conceivable type that prevent a backward flow, including valves lacking a valve seat and instead embodied as slide valves.

Because in the generic injection device the intermediate plunger arrives at a fixed end position defined by a stop at the end of the compression stroke, the same outset position is attained for this intermediate plunger prior to each intake stroke, so that this position corresponds to a definable cam path point. Angle control during governing, via the cam path and plunger control edges, is thus more easily controlled by being coupled with the time control determined by the control valve.

Control problems in such systems are in fact much greater than can be described here, especially because of spurious oscillations that are difficult to control. Spurious oscillations arise in the mechanical pump plunger drive, but they have a constant amplitude and constant frequency, and are distinguished solely by their phase location with respect to the injection. Although such spurious oscillations are virtually uncontrollable, a quantitative estimate of their effect on fuel quantity deviation can be made. In simplified terms, it can be assumed that in control by the control edges, the control quantity remains uninfluenced by the spurious oscillation. The situation is different with magnet valve control, where the critical spurious frequency is very high. At a constant amplitude, it can result in a fuel quantity error of several per cent, and this error is uncontrollable. The error can be divided in half by controlling the fuel quantity with a combination of control edges and the magnet valve, namely if one end is controlled with the control edge and the other with the magnet valve. On the other hand, triggering of a magnet valve by an electronic control unit should not be omitted. These comments apply not only to a magnet valve, but to a valve controlled in any way whatever.

In a known unit fuel injector (U.S. Pat. No. 4,235,374), the supply quantity and supply onset are determined by the opening and closing of a magnet valve disposed in the metering line to the pump chamber; a filling line that is unaffected by the magnet valve leads to the compression chamber of the unit fuel injector, and a check valve is disposed in this line. During a first intake stroke segment of the pump plunger, the magnet valve remains closed, so that with the pump chamber now closed, the intermediate plunger is pulled along with the pump plunger, causing fuel at low pressure to flow via the filling line and the check valve into the pressure chamber. Once a supply quantity intended for the injection has been metered, the magnet valve in the supply line opens, so that fuel at low pressure now flows via the supply line into the pump chamber, whereupon the intermediate plunger, because of the hydraulic forces then engaging it, remains where it had been.

In this known unit injector, the magnet valve then remains upen until the onset of the ensuing compression stroke, so that during the remaining intake stroke fuel flows into the pump chamber and fills it. Even during the repose segment of the cam path, the magnet valve remains open. The supply quantity flowing into the pressure chamber is thus determined by the opening instant of the magnet valve, by means of which the prestorage of the supply quantity in the pressure chamber is terminated. This manner of supply quantity determination is relatively imprecise, because it is indirect, so that besides the control errors noted above, many other kinds of factors can affect it, such as leakage in the line and valves, changes in flow conditions such as the opening forces of the check valve, and the varying temperature of the fuel and variations in the feed pump pressure.

Another disadvantage of this kind of indirect control is that especially at higher rpm, the supply line and filling line are affected both by the inertia of the intermediate plunger and by throttling action. For instance, the throttling effect of the magnet valve with respect to the pump chamber and of the check valve with respect to the compression chamber must be matched very precisely, as must the operative surface areas of the intermediate plunger in combination with the low fuel pressure and the spring urging the intermediate plunger toward the pressure chamber in this known unit injector. Since the dynamic force of the sluggish intermediate plunger varies as a function of rpm, and to determine the injection quantity, the intermediate plunger must be stopped during its intake stroke, the resultant function equations are extraordinarily complex and include an rpm-dependent factor, making theoretical predetermination of such a system impossible.

There are also considerable disadvantages in controlling the supply onset in this known unit fuel injector, because the magnet valve is not closed until a certain compression stroke segment of the pump plunger has been completed, and injection into the engine combustion chamber cannot take place until after that, or in other words not until the available fuel volume trapped in the pump chamber moves the intermediate plunger, to feed the fuel quantity pre-stored in the pressure chamber to the injection nozzle. In this first compression stroke segment, the corresponding portion of the fuel located in the pump chamber is pumped back to the fuel source, via the magnet valve and the supply line. In dynamic conditions, which vary with the rpm and are particularly influential at high rpm, this fuel flow reversal, or in other words this displacement back and forth of a volume of fuel, can lead to highly variable acceleration forces, which can cause an error in the desired instant of supply onset. This disadvantage is virtually unremediable, because the desired instant of supply onset is only conditionally dependent on the rpm, so that errors notoriously due to the rpm cannot be eliminated by using the rpm as the parameter. This problem is further exacerbated because in some cases the instant of supply onset must be varied as a function of other engine parameters, such as load, but in each case still as a function of the rpm.

Yet another disadvantage of this known unit injector is that the magnet valve must be embodied as a high-pressure valve, to be able to withstand the pressures arising during the compression stroke. Moreover, it must close during the compression stroke; although during return pumping there is as yet no injection pressure, still the pressure that prevails then is far higher than the feed pump pressure. This return pumping pressure varies with rpm within certain limits, which again has an effect on the closing process, with a tendency of dragging the supply onset in the "late" direction. In every case, such a magnet valve must also be designed for the injection pressure, that is, a maximum possible fuel pressure, which not only entails high production costs but also means high consumption of electricity during use. Since extraordinarily short control times are necessary, pre-controlled magnet valves are virtually out of the question. Since the pressure difference between the intake side and the high-pressure side is approximately 1:100, relatively slight deviations in timing or cross section have the effect of causing large errors in fuel quantity.

Another disadvantage of this known system is that because the supply quantity is controlled purely as a function of rotational angle, that is, indirectly via the magnet valve, any change in throttling action in the filling line to the pressure chamber results in an error in the quantity control. This is especially critical because the supply quantities in idling and at full load vary by a ratio of 1:15, and each must be metered if possible between the minimum and maximum rpm. To enable sufficiently accurate metering of a full-load quantity at maximum rpm, a minimum intake stroke segment is thus needed. Taking these conditions into account, it has already been proposed (German Patent Application No. 37 00 352.6), in a fuel injection device and in particular a unit fuel injector of the type described at the outset above, that the supply line controlled by the control valve be controlled by the pump plunger, and for this supply line to be disconnected from the pump chamber and connected to the filling line of the pressure chamber during a first intake stroke segment of the pump plunger, and then during a later segment of the intake stroke and during the repose segment of the cam driving the pump plunger to re-connect this supply line to the pump chamber, after first disconnecting the supply line from the filling line. This improves the control substantially. Since the entire quantity control, namely the control of both the supply quantity and the quantity determining the supply onset, is shifted to the run-off edge of the cam, the area available there for control can be enlarged, by correspondingly reducing the size of the compression stroke edge. The compression stroke edge now serves purely for high-pressure injection, and can therefore advantageously be embodied as very steep, which has advantages especially for the course of injection. Since neither the supply quantity nor the supply onset is controlled on the high-pressure side, the course of injection can advantageously be varied arbitrarily, without having to vary the supply quantity as well. By reducing the effective cam angle for the high-pressure edge, the angle for the run-off edge or the base circle of the cam can be correspondingly increased, so that more time is available for the intake stroke and repose segments, and the run-off edge can also have a correspondingly flatter course. In this way, the run-off edge can be made about 5 to 7 times flatter than the compression stroke edge. The metering time becomes correspondingly longer, and the critical spurious frequencies become correspondingly lower. It is possible for the spurious frequency to move into the vicinity of the injection frequency, which predominantly determines the phase location and amplitude of a neighboring spurious frequency. Because of the longer available control time, deviations in the fuel quantity to be controlled that are due to the magnet valve are also lessened, because such direct errors decrease in accordance with the increased time that is available. Entirely aside from that, a substantially less expensive low-pressure valve can be used as the magnet valve, with which still higher switching frequencies are attainable without problems. Moreover, because of the longer time that is available, such a magnet valve can also be used for direct control of both the supply quantity and the quantity determining the supply onset.

In this known proposal, reversing the fuel supply line from the pressure chamber to the pump chamber and back again to the pressure chamber is effected via the pump plunger itself, which thus acts as a mechanical control slide. Naturally an equivalent provision is also conceivable, in which a control slide driven synchronously with the pump plunger takes on this task.

In the above known proposal, the control valve is closed upon the onset of the intake stroke and opens to initiate the metering of the supply quantity into the compression chamber, whereupon the intermediate plunger already executes the required stroke because of the suction exerted by the pump plunger. The greater the intended supply quantity, the earlier the magnet valve will open. In each case, the pumping into the pressure chamber is interrupted whenever the pump plunger blocks the supply line. The magnet valve continues to be open, however, as long as the pump plunger reverses the fuel flow; thus in the repose segment, when the pump plunger has established the connection of the supply line to the pump chamber, fuel flows into the hollow chamber that has meanwhile formed in the pump chamber until the magnet valve closes again. This volume that has flowed in is definitive for the supply onset; that is, the earlier the magnet valve closes, the later the injection supply onset is effected.

Although the intermediate plunger always begins its intake stroke at the end stop, and the magnet valve advantageously need open and close only once per pump cycle, the otherwise floating intermediate plunger results in limit situations, in the connections among the chambers and conduits involved, that make it difficult to control the sources of error, in particular those caused by spurious oscillations but also those due to the magnet valve.

OBJECT AND SUMMARY OF THE INVENTION

The fuel injection device according to the invention has an advantage over the prior art that on the one hand, the adjusting spring causes the intermediate plunger, during the first intake stroke segment and until it strikes its stop, to rest on the pump plunger and follow it in accordance with the run-off edge of the cam. Thus, the intermediate plunger executes the same stroke each pump cycle. This means that the peripheral conditions, above all relating to oscillation, are the same during each cycle. Either the magnet valve can open and close again during the supply quantity metering segment, or else, combined with the edge control of the pump plunger, it can determine the instant of the onset or end of this metering. Thus, it is conceivable for the filling line to the pressure chamber still to be closed by the pump plunger when the magnet valve has already opened, or conversely it is possible for the magnet valve not to open until the communication between the suppy line and the filing line is already established by the pump plunger.

Because fuel metering into the pump chamber cannot occur until the intermediate plunger rests on its stop, a further danger of uncontrollable hydraulic connections or oscillations is advantageously avoided. Preferably, the supply line is not connected to the pump chamber until the respose segment of the cam is operative, or in other words until the pump plunger assumes its outset position. The pumping from the supply line onward takes place in each case in a pump chamber that is the same size each cycle, so that the same basic conditions are operative for the fuel metering from this side. The rpm-dependent time available naturally varies with the rpm and must be corrected by the opening period of the magnet valve. Thus, the point at which the pump chamber is opened for the metering is likewise dependent only on the angle.

In an advantageous feature of the invention, a magnet valve that is preferably closed when without current is used as the control valve. Although a magnet valve is preferably used in the invention, it is also naturally conceivable to use, instead of the magnet valve, a valve that is controlled electrically in some other way or by other means. According to the invention, the magnet valve is inserted into the pump housing in such a way that the spacing between the control site in the magnet valve and the control site at the pump plunger is minimized. With this kind of optimization, the supply line between the magnet valve and the pump piston are dispensed with. The decrease in the idle volume also minimizes its influence on the control process.

In a further advantageous feature of the invention, the intermediate plunger opens a relief conduit of the pump chamber toward the end of the compression stroke, so that not only the pressure chamber but the pump chamber pressure are now relieved toward the end of the compression stroke. This means that the outset conditions prior to the metering of fuel into the pump chamber and compression chamber are the same in every cycle, in particular in terms of the residual pressure. In another advantageous feature of the invention, the adjusting spring is disposed in the pump chamber, although it engages the intermediate plunger in the direction of the pump chamber. This makes the effect of the spring-dictated idle volume less disruptive than if the idle volume were located in the compression chamber. According to the invention, the adjusting spring may be wound helically about the intermediate plunger, being supported at one end on a shoulder of the bore forming the pump and compression chambers and on the other on a collar of the intermediate plunger.

In still another advantageous feature of the invention the drive of the pump plunger is effected by a drive cam that has a slowly rising intake stroke segment (intake stroke edge), a respose segment (base circle) and a steep compression stroke segment (compression stroke edge). According to the invention, the metering into the pump chamber that determines the supply onset can take place during the respose segment of the cam. Particularly favorable suction control is attained if the run-off edge approximates an Archimedes spiral.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
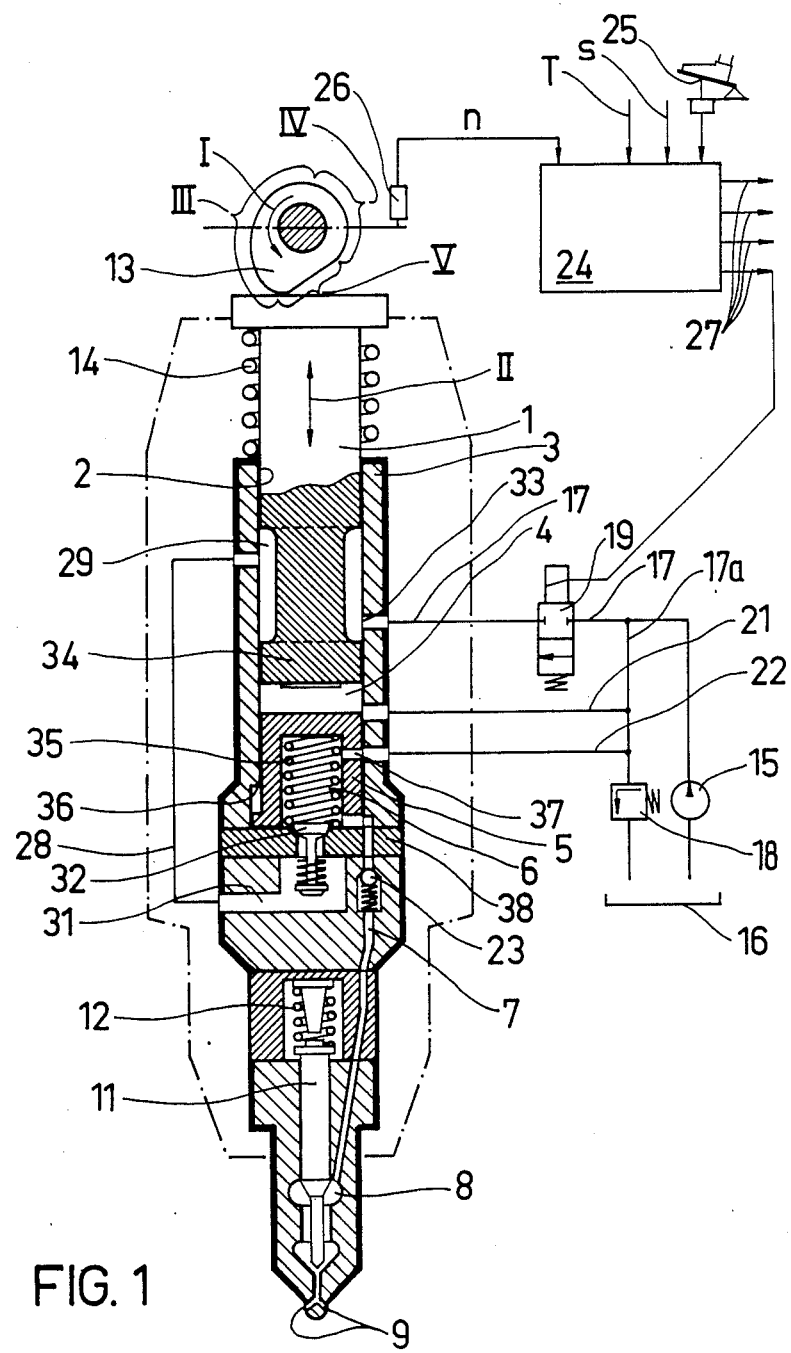
FIG. 1 is a highly simplified longitudinal section through the first exemplary embodiment in the form of an injection system having a unit fuel injector.

In the injection device shown in FIG. 1, a pump plunger 1 operates in a cylinder bore 2 of a housing 3 and defines a pump chamber 4, which is defined on the other end by an intermediate plunger 5, which likewise operates axially displaceably in the cylinder bore 2, On the end remote from the pump chamber 4, the intermediate piston 5 defines a pressure chamber 6, which communicates via a pressure conduit 7 with a nozzle pressure chamber 8, from which injection ports 9 branch off. The injection ports 9 are controlled by a valve 11 that is urged in the closing direction by a closing spring 12.

A drive cam 13, rotating in the direction of the arrow I, drives the pump plunger 1 for its reciprocating pump motion indicated by the arrow II, counter to the force of a restoring spring 14. The run-off path of the cam is divided into three segments: an intake segment III (intake stroke edge), a repose segment IV (base circle of the cam), and a steep compression stroke segment V (compression stroke edge). In the drawing, the compression stroke edge V is just now acting upon the pump plunger 1, in its last segment just prior to the transition to the intake stroke edge III; that is, as the cam 13 continues to rotate the pump plunger continues to travel downward for some distance before moving upward again for its intake stroke, in accordance with the intake stroke edge III.

The fuel injection device described here includes not only the unit fuel injector but also a lowpressure fuel system having a feed pump 15, which aspirates the fuel from a container 16 and pumps it via a supply line 17 to the unit injector; a pressure maintenance valve 18 is disposed in a branching line 17a leading back to the fuel container 16. In order to control the fuel flow to the unit injector in a timely manner, a 2/2-way magnet valve 19 is disposed in the supply line 17.

A relief conduit 21 branches off from the pump chamber 4, and a diversion conduit 22 branches off from the pressure chamber 6; these lines are each opened up by the intermediate plunger 5, in the position shown in FIG. 1 or in other words, nearly at the end position of the compression stroke, in order to relief pressure in both chambers 4 and 6. The relief conduit 21 and the diversion conduit 22, in the low-pressure fuel system of this instance, discharge into the supply line 17a upstream of the magnet valve 19. A pressure valve 23 is also disposed in the pressure conduit 7, for uncoupling of the pressure chamber 6 from the nozzle pressure chamber 8. In this highly simplified illustration, other leakage conduits and leakage devices, which are required between the high-pressure portion and this low-pressure portion of the system, are not shown.

The magnet valve 19 is triggered by an electronic control unit 24, so that the engine rpm or power and the injection onset can be governed or controlled via the opening and closing instants, or opening times, of the magnet valve 19. The load is fed into this electronic control unit 24 via a gas pedal 25, and the rpm n is fed to it via an rpm transducer 26; via at least two other transducers, not shown, the electronic control unit is also supplied with the temperature T and a further signal S relating to an exhaust gas value or to the ambient air pressure. Additional outputs 27 of the electronic control unit 24, four outputs of which are shown here, corresponding to a four-cylinder engine, each lead to one magnet valve 19 of a unit injector, of which there are then also four, but all of them are supplied in common by only a single feed pump 16 or one fuel container 16.

The unit fuel injector also has a filling line 28, which can be connected to the supply line 17 via an annular groove 29 disposed in the jacket face of the pump plunger 1 and discharges into the pressure chamber 6. In the pump plunger position shown in FIG. 1 this connection has just been made. There is a filling valve 32 embodied as a check valve at the end of the filling line 28, or in other words at its mouth into the pressure chamber 6.

The location of a mouth 33 of the supply line 17 in the cylinder bore 2 is selected such that during the first intake stroke segment, it is opened via the annular groove 29 and connected to the filling line 28. Once the pump plunger 1, during its intake stroke, has attained a metering stroke hz, the mouth 33 is blocked by the shank portion 34 of the pump plunger 1, and once further stroke travel has taken place and in accordance with the travel past it of the shank portion 34 it is opened up again, after which the supply line 17 communicates with the pump chamber 4. This takes place at the latest in the repose segment IV of the cam 13, or in other words when the pump plunger 1 assumes its intake stroke end position, which is also the compression stroke outset position.

The intermediate plunger 6 is urged toward the pump chamber 4 by an adjusting spring 35. The stroke of the intermediate plunger 5 toward the pump chamber 4 is also limited by a stop 36. The force of the adjusting spring 35 is great enough that during the intake stroke of the pump plunger 1, in each cycle, the intermediate plunger 5 meets the stop 36. Details of the function will be described below. For controlling the diversion conduit 22, a diversion bore 37 extending in the intermediate plunger 5 and discharging into the pressure chamber 6 is used. The relief conduit 21 is controlled by the upper edge of the intermediate plunger 5, so that since both conduits, that is, the relief conduit 21 and the diversion conduit 22, are controlled by the intermediate plunger 5, a very precise instant of diversion is attainable for both work chambers, namely the pump chamber 4 and the pressure chamber 6. This assures with certainty that at the end of supply the intermediate plunger 5 will rest on a stop plate 38 of the unit injector and thus assumes a defined position prior to the intake stroke onset, even though the pump plunger 1 has not yet entirely ended its compression stroke and then at the end of the compression stroke will either directly or nearly strike the intermediate plunger 5. During this last segment of the compression stroke, the pump plunger 1 pumps a residual quantity out of the pump chamber 4 into the opened relief conduit 21.

Figure 2:
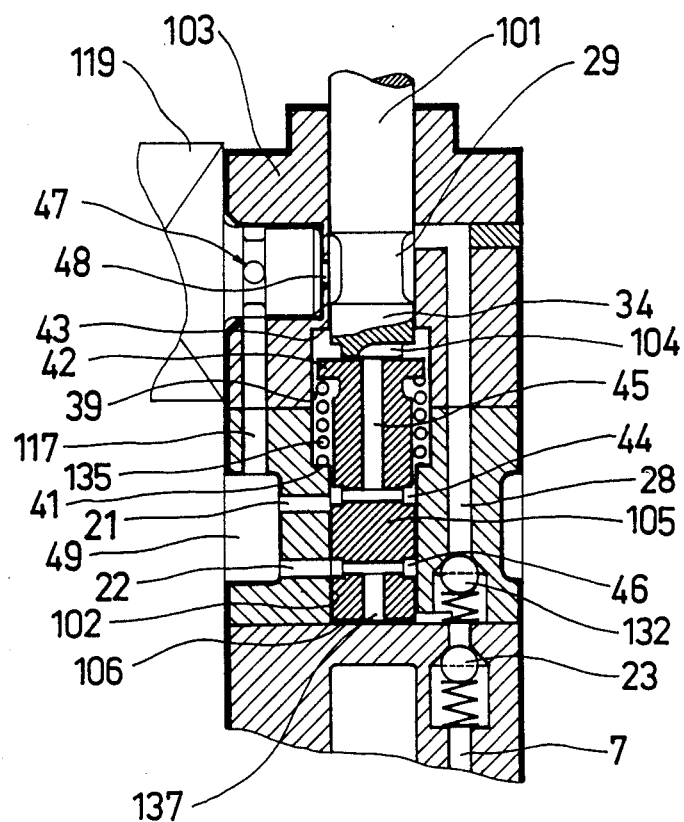
FIGS. 2 and 3 show the second exemplary embodiment of a unit fuel injector, of which although only a detail is shown but the detail itself is in structurally complete form, seen in the position at the end of the compression stroke (FIG. 2) and at the end of the intake stroke (FIG. 3)
Figure 3:
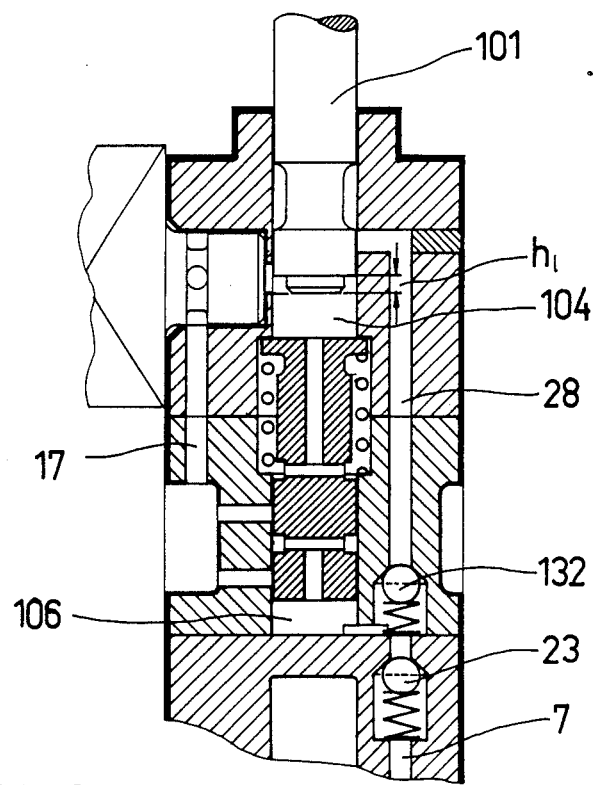

Although FIGS. 2 and 3 show only a portion of the second exemplary embodiment, this portion is shown structurally complete; the reference numerals for parts that are like those of the first exemplary embodiment, even though they are differently embodied, are the same, increased by 100. In FIG. 2, the pump plunger 101 and the intermediate plunger 105 has assumed their respective positions at the end of the compression stroke, that is, the beginning of the intake stroke, and in FIG. 3, each has assumed its position at the end of the intake stroke, which is the beginning of the compression stroke.

To minimize the idle volume, an annular groove 39 for receiving the adjusting spring 135 is provided in the cylinder bore 102 of the plunger 101; the adjusting spring 135 is wound helically around the intermediate plunger 105 and is supported at one end on one end face 41 of the annular groove 39 and on the other on a collar 42 of the intermediate piston 105. The annular groove 39 is open toward the pump chamber 104, so as largely to free the pressure chamber 106 of idle volumes. The stop for the intermediate plunger 105 in this case is provided by the second end face 43 of the annular groove 39, in cooperation with the collar 42 of the intermediate plunger 105. Since the upper end of the intermediate plunger 105 is now no longer guided radially sealingly, the control of the relief conduit is no longer effected via the upper control edge but rather via an annular groove 44, in the jacket face of the intermediate plunger 105, that communicates with the pump chamber 104 via a bore 45 extending in the intermediate plunger 105. In this embodiment, the diversion bore 137 also discharges into another annular groove 46, in the jacket face of the intermediate plunger 105, that in turn controls the diversion conduit 22.

In this exemplary embodiment, a portion of the magnet valve 119 is inserted directly into the housing 103 of the unit injector in such a manner that the spacing between a control site 47 of the magnet valve 119 and the end 48 of the supply line 117 is minimized. Only a very short segment remains of the supply line downstream of the magnet valve 119.

The chamber 49 in the housing 103 of the unit injector from which the supply line 117 branches off and into which both the relief conduit 21 and the diversion conduit 22 discharge will be called the suction chamber, and as described in conjunction with FIG. 1, it is part of the low-pressure fuel system; the suction chambers 49 of the pump injectors belonging to one engine all communicate with one another.

The mode of operation of the invention will now be described in conjunction with this second exemplary embodiment shown in FIGS. 2 and 3, and referring to the function diagram of FIG. 4.

In this diagram, the rotational angle of the camshaft and hence of the cam is plotted on the abscissa, and the stroke h of the pump plunger 101 or intermediate plunger 105 is plotted on the ordinate.

In FIG. 3, the pump plunger 101 assumes the position that is approximately equivalent to the origin or zero point of the diagram, that is, its bottom dead center position hereinafter referred to as UT, in accordance with the base circle of the cam. After that, the compression stroke of the pump piston 101 begins; in accordance with FIG. 3, the pump plunger 101 is displaced downward, which in the diagram corresponds to an upwardly oriented curve segment. The pump plunger 101 is driven by the compression stroke edge V of the cam 13 equivalent to the rotational angle segment V, here assumed to be approximately 54°, as compared with 360° for a full cam rotation. This total stroke is indicated by hm. In this compression stroke, first the pressure in the hollow space located in the pump chamber 104 is equalized, after which a trapped volume of fuel, which determines the supply onset, remains. This state is attained after the execution of the stroke hs, equivalent to a rotational angle αs. Even before that, namely after the stroke hl has been executed, the shank portion 34 of the pump plunger 101 blocks the end 48 of the supply line 117, to uncouple the low-pressure region from the high-pressure region. While the stroke hl remains the same at each compression stroke onset, the stroke hs varies as a function of the fuel quantity metered into the pump chamber 104. The larger this fuel quantity is, the shorter the stroke hs; and the smaller the volume of fuel present, the longer this stroke is and correspondingly the later the hollow space is equalized.

As the compression stroke of the pump plunger 101 continues, the intermediate plunger 105 is driven with it, counter to the force of the adjusting spring 135, via the trapped volume, but first the hollow space located in the pressure chamber 106 is equalized. This is the case after the stroke hv has been executed. Once again, it is true that the stroke hv varies with the fuel volume metered into the pressure chamber 106. That is, the larger the pre-stored quantity, the longer this stroke hb. The actual injection can accordingly occur only after the two strokes hs and hv have been added together, or in other words once all the pressures in the hollow spaces have been equalized. In the extreme case, that is, if no fuel metering took place in the pump chamber 104, the pre-stroke of the intermediate plunger 105 begins only once the pump plunger 101 strikes the intermediate plunger 105 while it is resting on the stop 43. The intermediate plunager 105 is then mechanically carried along by the pump plunger 101. In such a case, the intermediate plunger 105 begins its stroke at hA. In such a case, the supply onset of the fuel injection pump, which determines the injection onset, is adjusted to be as late as possible, which may for instance be desired at relatively low rpm. For an extremely early injection, hs is as short as possible or in other words is about of equal length with hl, so that the intermediate plunger 105 lifts away from the stop 43 as soon as the mouth 48 of the supply line 117, and hence the low-pressure region, is blocked.

Once the stroke hv has been executed, the actual injection begins, until such time as the intermediate plunger 105, in the vicinity of its top dead center, opens the relief conduit 21 of the pump chamber 104 and the diversion conduit 22 of the pressure chamber 106 via the annular grooves 44 and 46. The requisite stroke for this is indicated as he, and in the extreme case it largely coincides with the injection stroke end hE of the pump plunger 101. This is the case whenever, at an extreme setting for a late injection onset, as described above, the pump plunger 101 displaces the intermediate plunger 105 directly mechanically into its end position. The maximum possible injection quantity is attained whenever there is no hollow space available in the pressure chamber 106, or in other words when the injection pumping from the pressure chamber 106 already begins when the intermediate plunger 105 rises from the stop 43, so that the maximum possible stroke of the pump plunger for the injection pumping is $he = hE - hA$, but in the normal situation, $he = hE - hv - hs$.

As soon as the pressure in the hollow spaces in the pump chamber 104 and pressure chamber 106 are equalized, the continued drive of the pump plunger 101 results in a correspondingly rising pressure in both chambers, until after the high injection pressure is attained, the valve needle 11 opens counter to the force of the closing spring 12, and the fuel is injected out of the pressure chamber 106 into the combustion chamber, via the pressure valve 23, the pressure conduit 7, the pressure chamber 8 and the injection ports 9. For the entire control range, a stroke of the pump plunger 101 of $he - hl$ is available; for varying the supply quantity, the range of $hE - hA$ is available, or in other words the maximum possible stroke of the intermediate plunger 105 is available, while contrarily, the stroke segment between hA and hl is available for varying the injection onset. This is equivalent to a rotational angle range of the cam from α1 to αE.

The pump plunger 101 continues its compression stroke until the end of the rotational angle αV, after which the intake stroke begins, in accordance with the intake stroke segment III of the cam, or in other words equivalent to a rotational angle αIII. The pump plunger 101 now assumes the top dead center position OT shown in FIG. 2 prior to the intake stroke. The intermediate plunger 105 is retained mechanically by the pump plunger 101 in its own OT position, namely its outset position, which is the same for each cycle, so continued that for accurate fuel quantity metering, the same outset conditions are always set. The pump plunger 101 assumes its maximum stroke hm at OT.

Now when the intake stroke begins, in that the pump plunger 101, being pressed by the restoring spring 14 onto the intake stroke edge as the cam 13 continues to rotate, follows the cam path, the intermediate plunger 105 also follows the pump plunger 101, because of mechanical contact and because it is driven by the adjusting spring 135. Once the stroke hm−hE is executed, the annular grooves 44 and 46 are disconnected from the relief conduit 21 and the diversion conduit 22, so that the pump chamber 104 and the pressure chamber 106 are uncoupled from the low-pressure region or in other words from the suction chamber 49. Only now can fuel metering, of whatever kind, begin in these chambers. This point is attained at $\alpha E2$. As the curve in FIG. 4 shows, the intake stroke rotational angle designated for the intake side by $\alpha III$ and $\alpha IV$ is virtually 7 times as large as the rotational angle $\alpha V$ available for the compression stroke. This time can be divided into the time tl for fuel quantity metering and the time t2 for metering the quantity that determines the supply onset and is to be metered into the pump chamber.

In the intake stroke, the supply quantity to be injected is metered first. For the stroke range hA to hm, the end 48 of the supply line 117 communicates, in the annular groove 29 of the pump plunger 101, with the filling line 28 leading to the pressure chamber 106. During the compression stroke, this communication has no effect, since the filling valve 132 uncouples the pressure chamber 106 from the low-pressure region. During the intake stroke region ($\alpha III$), contrarily, fuel can be metered into the pressure chamber 106 via this filling line, and this always occurs whenever the magnet valve 119 is opened and fuel flows into the pressure chamber 106 from the suction chamber 49, via the supply line 117, the control site of the magnet valve 47, the annular groove 29, the filling line 28, and the filling valve 32. Because of the negative pressure established in the pressure chamber 106 by the intake stroke of the pump plunger 101 and above all by the adjusting spring 135, a feed or pumping pressure for fuel metering is attained that is independent of the rpm and hence always remains constant, in accordance with the constant suction chamber pressure, so that except for throttling effects, the metered quantity is determined by the opening time of the magnet valve 119. Throttling effects dependent on rpm can be eliminated in a known manner by adaptation of the suction chamber pressure. To make the function easier to understand, the description provided here has been made solely in terms of static conditions. The fuel flowing out of the suction chamber 49 via the diversion conduit 22 into the compression chamber 106 during the first segment of the intake stroke, namely up to the rotational angle $\alpha E2$, is correspondingly diverted back into the suction chamber 49 at the end of the compression stroke, so that this quantity does not function as an injection quantity. Although the magnet valve 119 can already be opened before the beginning of the intake stroke, the opening time segment beginning at rotational angle $\alpha E2$ is all that has an effect on the metering of the injection quantity. In FIG. 4, the opening time of the magnet valve for metering the injection quantity is indicated at tl, and while the actually effective segment of this time, which thus begins at rotational angle $\alpha E2$, is designated as tle. During this latter time segment, the pump plunger 101 together with the intermediate plunger 105 executes the stroke he, which corresponds to a volume of he times the crosssectional area of the pump plunger 101, or the same cross section of the intermedaite plunger 105. This effective time tle can be continued at a maximum until rotational angle $\alpha A$, corresponding to the then ensuing impact of the intermediate plunger 105 against the stop 43. This defines the maximum meterable injection quantity as well.

Figure 4:
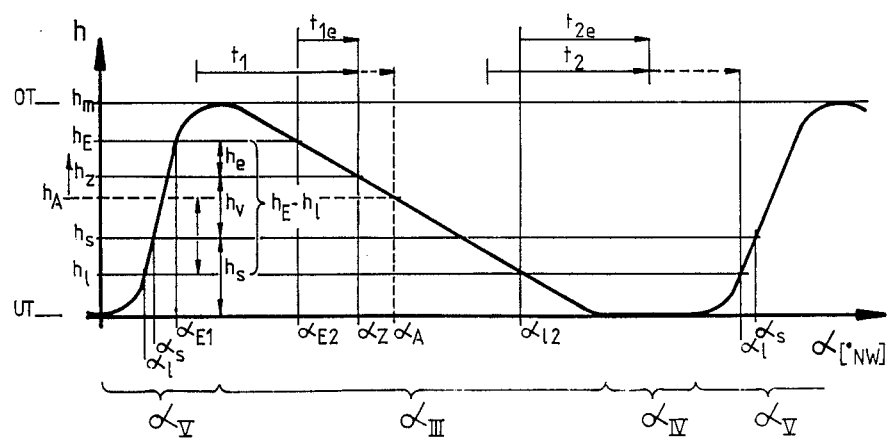
FIG. 4 is a function diagram to explain the functioning of the unit fuel injector.

If the magnet valve during idling or at partial load is closed prior to the attainment of the rotational angle $\alpha A$, as shown in FIG. 4, then for the remaining stroke of the intermediate plunger 105, namely until its impact with the stop 43, a space forms in the compression chamber 106, which in the compression stroke collapses into itself again and is equalized, without any effect on the injection. Thus the force of the adjusting spring 135 must in every case be so great that a vacuum pressure is overcome, in order to assure that the intermediate plunger 105 will in fact rest mechanically on the pump plunger 101 and then separate from it only thereafter, although this has an influence only on the fuel metering into the pump chamber 104. Correspondingly, for this injection quantity metering range, the supply line 117 must communicate with the filling line 28 via the annular groove 29, so that the metered fuel flow is determined only by the opening time of the magnet valve 119.

On the continuation of the intake stroke of the pump plunger 101 and after the contact of the intermediate plunger 105 on the stop 43 (that is, from $\alpha A$ on), a space is created in the pump chamber 104 at least until such time as the shank portion 34 of the pump plunger 101 has overtaken the mouth 48 of the supply line 117 and re-opened it. This takes place at the latest in the position of the pump plunger 101 shown in FIG. 3. The chambers communicating with the pump chamber 104, that is, the annular chamber, or the bore 45 and annular chamber 44 receiving the adjusting spring 135, should be as small as possible, because these chambers, as idle volumes, can exert a disrupting influence. This is naturally also true of the region of the mouth of the supply line 117, that is, its mouth 48 and the portion of the magnet valve downstream of the control site 47.

The communication between the supply line 17 and the pump chamber 104 is attained before the pump plunger 101 reaches bottom dead center UT, so that pumping into the pump chamber 104 of the fuel quantity determining the instant of supply inset can begin even before UT. Since in any case the remaining time segment for this metering is relatively short, the magnet valve 119 can already have opened before this opening of the mouth 48 of the supply line 17 by the pump plunger 101 occurs, so as to eliminate errors resulting from delayed opening of the magnet valve. In FIG. 4, the opening time of the magnet valve for the control of supply onset is indicated at t2, and the effective metering occupies only the time segment t2e. This latter effective metering begins at rotational angle $\alpha E2$. Since this metering is effected into a hollow space, which has not yet been equalized at the beginning of the compression stroke but instead is equalized only upon attainment of the stroke hs at $\alpha S$, the time t2 can thus extend until rotational angle $=\alpha 1$ of the ensuing compression stroke. This will be the case whenever the injection onset is shifted to very early, for intance at high rpm.

After this intake stroke control, which extends over the intake stroke edge and the respose segments of the cam, or in other words its rotational angles αIII and αIV, the above-described compression stroke then ensues again, in which the low-pressure fuel circuit is correspondingly uncoupled from the high-pressure fuel circuit. According to the invention, the division between the intake stroke segment and the respose segment can also be shifted in favor of the respose segment, to make a longer metering time t2 available for controlling the supply onset. Preferably, however, both types of metering involve a combined time/angle control, so that at least one of the control functions in metering will be taken over by the angledependent control edge of the pistons, thereby reducing control errors due to a magnet valve by half.

The order in which the annular grooves 44 and 46 open the corresponding conduits 21 and 22 can also be shifted, according to the invention, such that toward the end of the compression stroke, the annular groove 46 opens the diversion conduit 22 first, in order thereby to initiate the end of injection, and the relief conduit 21 is opened by the annular groove 44 only thereafter, to assure that the intermediate plunger 105 will always actually be displaced into its end position.

Because of this control of fuel quantity in a clear, mutually independent manner into the pump chamber 104 and the pressure chamber 106, it is possible for additional quantities of fuel, which affect the injection onset, to flow in a controlled manner out of the pump chamber 104 during the compression stroke, without thereby affecting the supply quantity that attains injection.

The foregoing relates to preferred exemplary embodiments of the invention, it being understood that other variants and embodiments thereof are possible within the spirit and scope of the invention, the latter being defined by the appended claims.

WHAT IS CLAIMED AND DESIRED TO BE SECURED BY LETTERS PATENT OF THE UNITED STATES IS:

1. A fuel injection device, in particular a unit fuel injector, for internal combustion engines,
    having a pump chamber (4; 104) of a pump plunger (1; 101) driven by a drive cam 13 with a constant working stroke;
    a pressure chamber (6; 106) which supplies fuel to at least one injection nozzle (8-12) via a pressure line (7);
    having an intermediate plunger (5; 105) which hydraulically separates the pump chamber (4; 104) from the pressure chamber (6; 106);
    a supply means onset, determining the injection onset, for supplying the fuel from the pressure chamber (6; 106) to said at least one injection nozzle (8-12) as a function of the volume of fuel trapped for this purpose in the pump chamber (4, 104);
    a supply quantity, intended for the injection, serving as the fuel volume present for that purpose in the pressure chamber (6; 106);
    means for determining the end of supply by opening of a diversion conduit (22) of the pressure chamber (6; 106) toward the end of the compression stroke by said intermediate plunger (5; 105), wherein said intermediate plunger (5; 105) always attains a predetermined end position at the end of the compression stroke;
    an adjusting spring (35; 135) engaging the intermediate plunger (5; 105);
    a filling line (28) leading to said pressure chamber (6; 106) and including a filling valve (32; 132);
    a common low-pressure fuel source supply line (17; 117) which is connectable to the pump chamber (4; 104) as well as to a filling line (28);
    a control valve (19, 119) in the supply line (17; 117) for controlling the fuel volumes in the pump chamber (4; 104) and pressure chamber (6; 106), wherein during the intake stroke of the pump plunger (1; 101) the pressure chamber (6; 106) is supplied with fuel first and the pump chamber (4; 104) is supplied with fuel only thereafter;
    characterized in that
    said supply line (17; 117) and said filling line (28) are controlled by said pump plunger (1; 101);
    wherein said supply line (17; 117), during one segment (αIII) of the intake stroke of the pump plunger (1; 101), communicates with said filling line (28) and is disconnected from the pump chamber (4; 104), and during another segment (αIV), during which the pump plunger (1; 101) is near its compression stroke outset position (UT) communicates with the pump chamber (4; 104) and is disconnected from the filling line (28);
    said adjusting spring (35; 135) acts upon the intermediate plunger (5; 105) in the direction of the pump chamber (4; 104);
    that the force of the adjusting spring (35; 135) is greater than the force engaging the intermediate piston (5; 105) by means of the fuel source of lower pressure;
    the intake stroke end position of the intermediate plunger (5; 105) is determined by a stop (43); and
    the intermediate plunger (5; 105) always rests on the stop (43) at the end of the intake stroke.

2. A fuel injection device as defined by claim 1, in which said supply line (17; 117) is blocked by a shank portion (34) of the pump plunger (1; 101) during an intermediate segment of the intake stroke.

3. A fuel injection device as defined by claim 1, in which a communication of the supply line (17; 117) with the filling line (28) is controlled by an annular groove (29) of the pump plunger (1; 101).

4. A fuel injection device as defined by claim 2, in which a communication of the supply line (17; 117) with the filling line (28) is controlled by an annular groove (29) of the pump plunger (1; 101).

5. A fuel injection device as defined by claim 1, in which said control valve is a magnet valve (19; 119) that is preferably closed when without current, and that said magnet valve (19; 119) is triggered by an electronic control unit (24), in which engine parameters such as rpm (n) and temperature (T) are processed.

6. A fuel injection device as defined by claim 5, in which a portion of said magnet valve (19; 119) is inserted into the pump housing (3; 103) such that a spacing between a control site (47) of said magnet valve (19; 119) and a control site (29) on the pump plunger (1; 101) is minimized.

7. A fuel injection device as defined by claim 1, in which said intermediate plunger (5; 105) opens a relief conduit of the pump chamber (4; 104) toward the end of the compression stroke.

8. A fuel injection device as defined by claim 2, in which said intermediate plunger (5; 105) opens a relief conduit of the pump chamber (4; 104) toward the end of the compression stroke.

9. A fuel injection device as defined by claim 4, in which said intermediate plunger (5; 105) opens a relief conduit of the pump chamber (4; 104) toward the end of the compression stroke.

10. A fuel injection device as defined by claim 7, in which said relief conduit (21/45) extends in segments in the intermediate plunger (105).

11. A fuel injection device as defined by claim 8, in which said relief conduit (21/45) extends in segments in the intermediate plunger (105).

12. A fuel injection device as defined by claim 9, in which said relief conduit (21/45) extends in segments in the intermediate plunger (105).

13. A fuel injection device as defined by claim 1, in which said adjusting spring (135) is disposed in the pump chamber (104).

14. A fuel injection device as defined by claim 5, in which said adjusting spring (135) is disposed in the pump chamber (104).

15. A fuel injection device as defined by claim 7, in which said adjusting spring (135) is disposed in the pump chamber (104).

16. A fuel injection device as defined by claim 13, in which said adjusting spring (135) is wound helically around said intermediate plunger (105) and is supported on one end on a shoulder (41) of a bore (39) forming the pump chamber (104) and on the other end on a collar (42) present on the intermediate plunger (105).

17. A fuel injection device as defined by claim 14, in which said adjusting spring (135) is wound helically around said intermediate plunger (105) and is supported on one end on a shoulder (41) of a bore (39) forming a pump chamber (104) and on the other end on a collar (42) present on the intermediate plunger (105).

18. A fuel injection device as defined by claim 15, in which said adjusting spring (135) is wound helically around said intermediate plunger (105) and is supported on one end on a shoulder (41) of a bore (39) forming the pump chamber (104) and on the other end on a collar (42) present on the intermediate plunger (105).

19. A fuel injection device as defined by claim 1, which includes a drive cam (13), which has a flatly dropping intake stroke segment (intake stroke edge III), a repose segment (base circle IV) and a steep compression stroke segment (compression stroke edge V) for driving said pump plunger (1, 101).

20. A fuel injection device as defined by claim 19, in which the curve of said intake stroke edge follows an Archimedes spiral.

21. A fuel injection device as defined by claim 19, in which said cam is rotated such that fuel metering into the pressure chamber takes place during the first intake stroke segment (corresponding to an intake stroke edge), and the fuel metering into the pump chamber (4; 104) takes place at the latest during the repose segment (corresponding to the base circle).

22. A fuel injection device as defined by claim 20, in which said cam is rotated such that fuel metering into the pressure chamber takes place during the first intake stroke segment (corresponding to an intake stroke edge), and the fuel metering into the pump chamber (4; 104) takes place at the latest during the repose segment (corresponding to the base circle).

* * * * *